(12) United States Patent
Hurley et al.

(10) Patent No.: US 6,629,608 B2
(45) Date of Patent: Oct. 7, 2003

(54) SHIPPING PROTECTOR

(75) Inventors: Richard B. Hurley, Corvallis, OR (US); Thomas J. Taylor, Corvallis, OR (US); Scott S Seelye, Corvallis, OR (US); Mark W. Betts, Corvallis, OR (US)

(73) Assignee: Western Pulp Products Co., Corvallis, OR (US)

( * ) Notice: Subject to any disclaimer, the term of this patent is extended or adjusted under 35 U.S.C. 154(b) by 100 days.

(21) Appl. No.: 09/935,468

(22) Filed: Aug. 22, 2001

(65) Prior Publication Data

US 2003/0038054 A1 Feb. 27, 2003

(51) Int. Cl.[7] ............................................... B65D 81/02
(52) U.S. Cl. ....................................... 206/586; 206/453
(58) Field of Search ............................... 206/586, 453, 206/320, 326

(56) References Cited

U.S. PATENT DOCUMENTS

| | | | | |
|---|---|---|---|---|
| 3,047,142 A | * | 7/1962 | Heffley | 206/453 |
| 3,762,626 A | * | 10/1973 | Dorsey | 206/586 |
| 4,120,441 A | * | 10/1978 | Hurley | |
| 4,742,916 A | * | 5/1988 | Galea | |
| 4,838,427 A | * | 6/1989 | Hurley | |
| 5,335,770 A | * | 8/1994 | Baker | |
| 5,678,692 A | * | 10/1997 | Gratz | |
| 5,772,037 A | * | 6/1998 | Hurley | |
| 5,816,409 A | * | 10/1998 | Baker | |
| 6,470,637 B2 | * | 10/2002 | Gratz | 52/287.1 |

* cited by examiner

Primary Examiner—Shian Luong
(74) Attorney, Agent, or Firm—Robert L. Harrington; Schwabe Williamson & Wyatt

(57) ABSTRACT

A corner protecting device of vacuum molded paper fiber wherein the device is molded onto a porous mold form, the mold form having valleys about twice the width of the material thickness when molded causing the material at the two sides of the valleys to merge and form columnar-like lands connected by rebounding arch-shaped material thus producing a complex resistance to crushing. Splitting is reduced by undulating tunnel configurations, bottom flanges and a dome shaped peak.

15 Claims, 3 Drawing Sheets

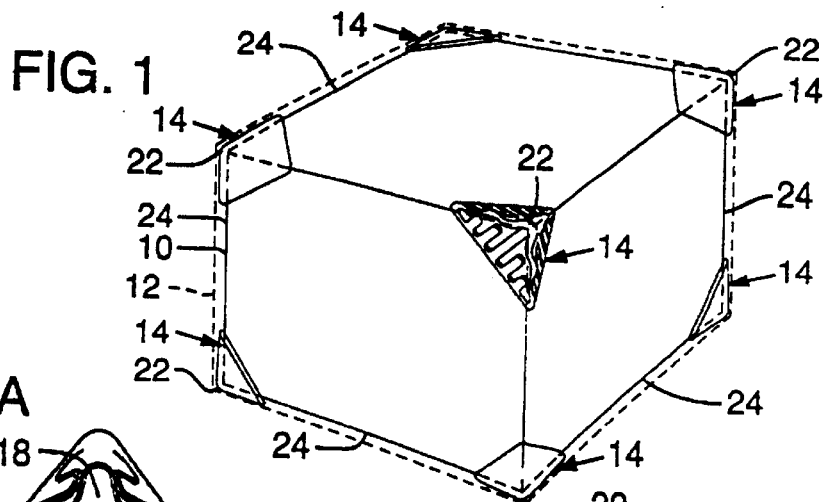
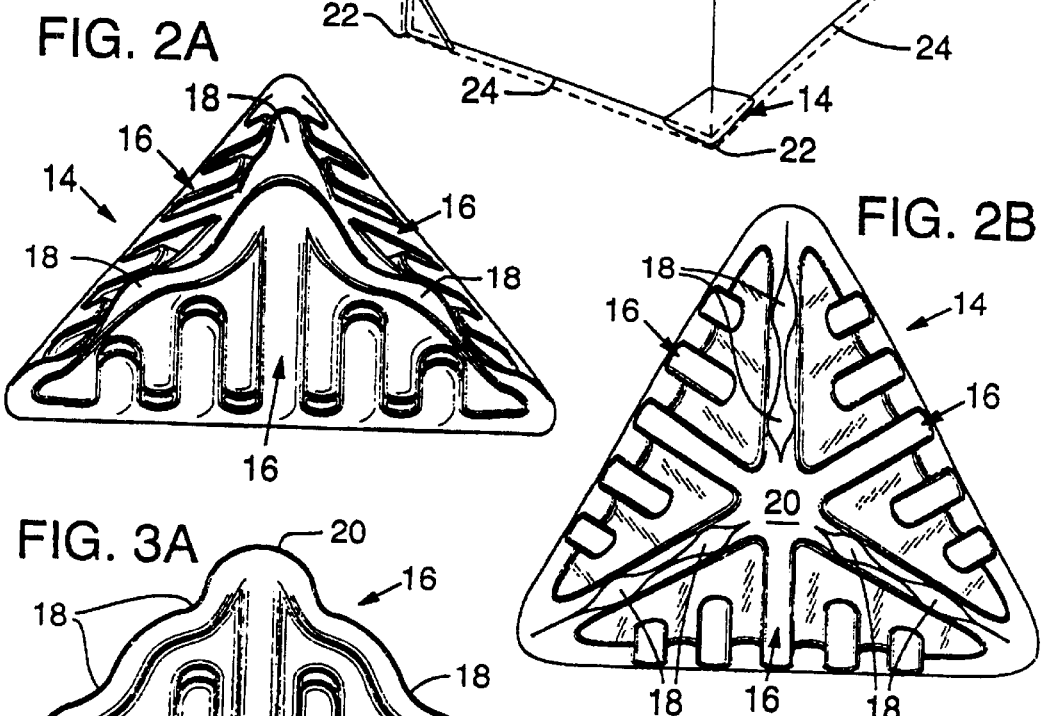
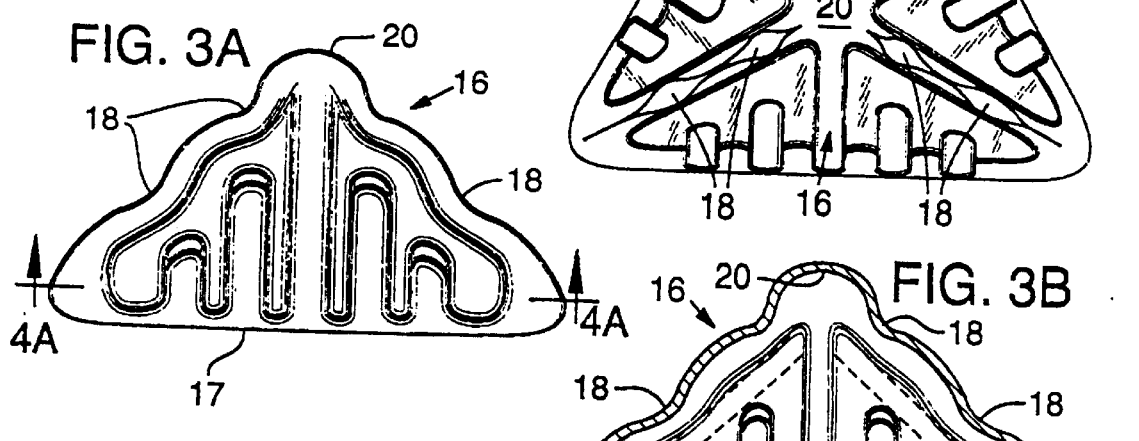
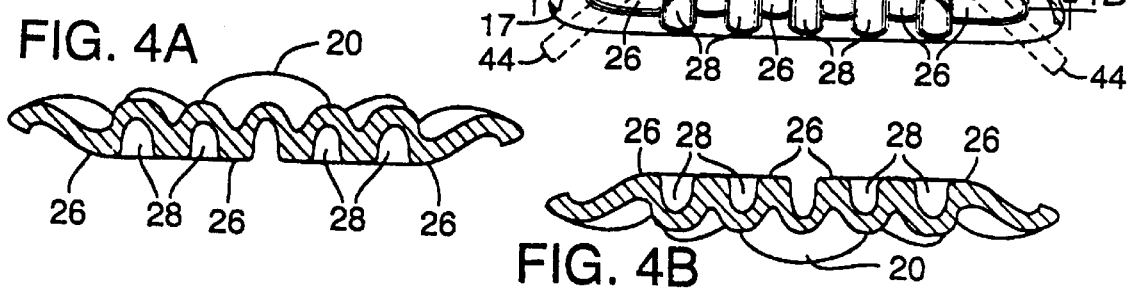

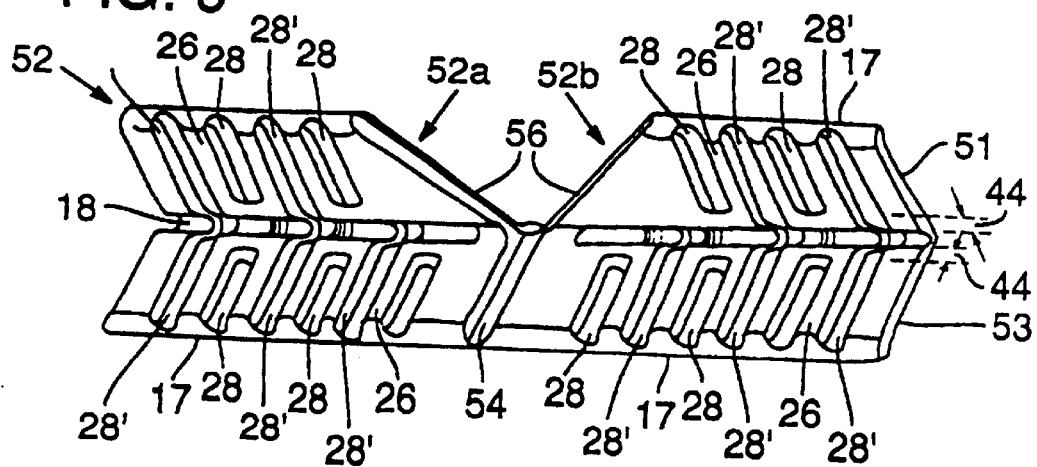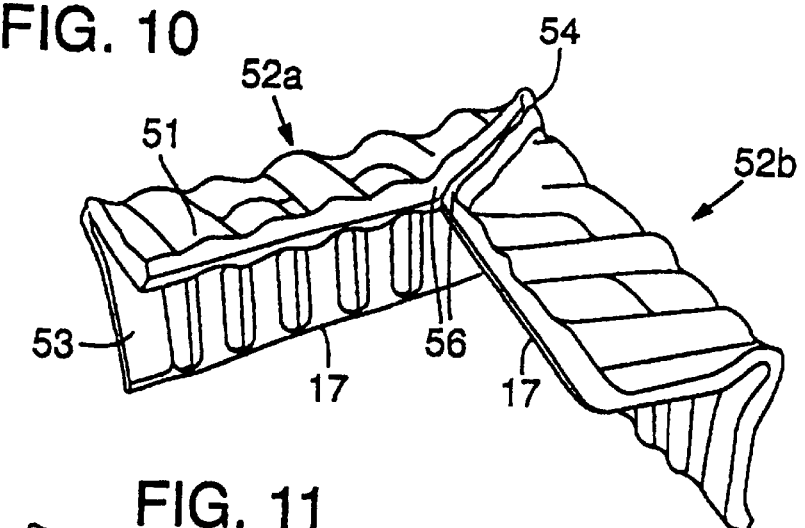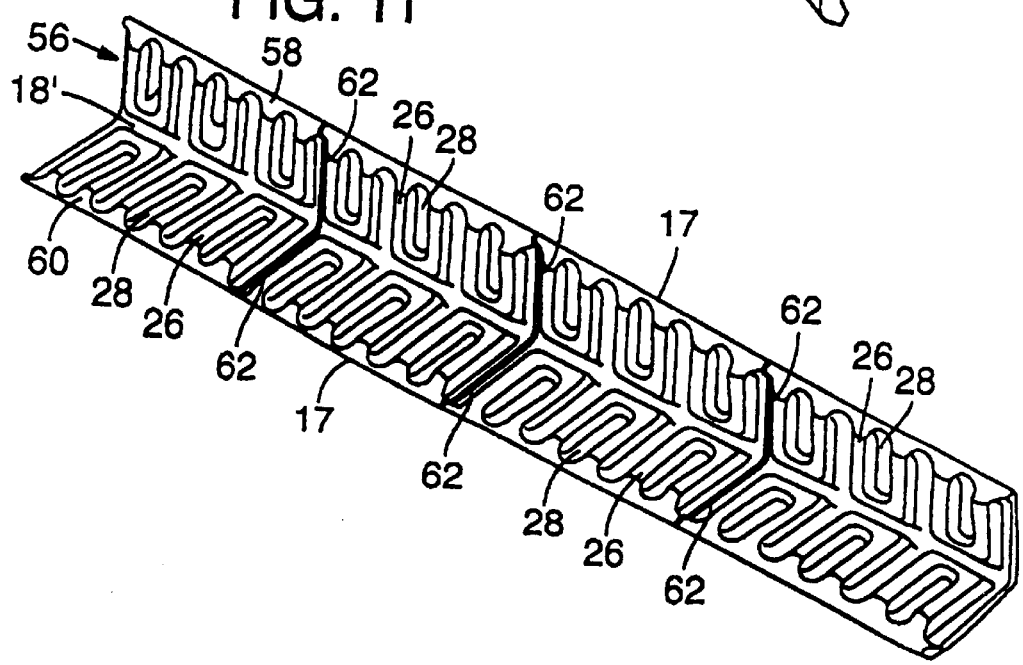

SHIPPING PROTECTOR

FIELD OF THE INVENTION

This invention relates to protective cushioning devices applied to corners and edges of a wide variety of articles including but not limited to kitchen and bathroom cabinets, furniture, case goods, etc. (hereafter collectively referred to as "articles") which are then customarily packed in cartons, shrink packs or blanket wrapped for shipping.

BACKGROUND OF THE INVENTION

Shipping containers holding articles such as kitchen cabinets, etc. may be handled numerous times before reaching the end user. Such articles are stacked, stored and transferred by individuals using mechanized equipment such as conveyors, hand trucks and fork lift trucks to name but a few. It is common that a substantial percentage of such articles are bumped, jarred, dropped, squeezed, etc. as they are moved from place to place through the channels of trade. Damage costs can be excessive and it has been found that damage by such handling of products can be substantially reduced by applying corner and/or edge protecting devices to the articles.

Such devices must be low cost but have sufficient cushioning capability, e.g., to protect an article weighing upwards of 250 pounds contained in a shipping container and protected by the protecting devices when dropped from a height of, e.g., 1–3 feet onto a hard surface such as a concrete floor in a warehouse. Such devices must possess adequate resiliency to offer protection from repetitive impacts following an initial jolt.

A type of corner protecting device to which the present invention is directed is illustrated in U.S. Pat. No. 4,838,427. Three triangular shaped sides are joined together at abutted edges to form a hollow pyramid-like shape. The pyramid-like shape is designed to fit the corners of the article and with all the corners of at least one planar surface, e.g., the top, covered by the protective devices, to fit into a shipping container. The devices are constructed of recycled paper fibers, e.g., waste paper and cardboard, that are vacuum formed from a slurry of the fiber. To obtain the desired cushioning effect, the sides of the device are formed into a serpentine configuration that resistively flattens when force is applied. At the side edge junctures of the device which fits over an edge portion of the article adjacent a corner, a channel or tunnel is formed at these junctures to provide a semicircle (cavity) that surrounds the edge and has to be collapsed before the corners of the article are impacted as when dropped on a hard surface.

Whereas the above construction is widely used in industry, there are undesired limits. For example:

(a) An impact directed at an edge can too easily cause splitting of the device at the side edge juncture (the tunnel) with likely damage to the article, i.e., to an underlying edge of the article.

(b) If the article being protected is structured (as it often is) with an open, or inset, top or bottom, the only engagement or support provided by the protecting device is along the edges of the side wall panels that make up that corner. These exposed (or extended) edges of the side wall panels are referred to as "reveals." Any impact directed at the edge will in part be directed toward the reveal which is supported by a narrow strip of the side wall of the device overlying the reveal. Because the side wall of the protective device is serpentine in configuration, and because the panel edge thickness is narrow, e.g., typically ranging from ⅜ to ¾ inch, the edge of the protecting device underlying the reveal is a sequence of spaced apart narrow strips of the support material and likely not adequate to prevent damage.

(c) There is a limit to the thickness of the fiber mat produced in the vacuum forming process and once the serpentine of the device is flattened, the unabsorbed impact force in large measure transmits through the material and is transferred to the protected article.

(d) An impact directed at the peak of the protective device (the apex of the pyramid) will sometimes crush the peak of the device which may cause splitting along the tunnel. The underlying corners and edges are then vulnerable to impacts.

(e) The serpentine shape of the side edges, while enhancing the cushioning capability of the device is extended down to the exposed bottom edge of the device. This exposed edge is susceptible to splitting as the device is pushed onto an article corner under impact which induces spreading of the pyramid sides. Typically, a resistive force to such spreading is provided by a close fitting external shipping container.

BRIEF DESCRIPTION OF THE INVENTION

In summary, prior art devices were formed into a hollow pyramid shape, the inside walls of the pyramid being a serpentine shape and the juncture between the walls bulged outwardly to form a tunnel, i.e., three tunnels provided for the three side wall junctures which overlay the three edges of an article which converge to form a corner.

The serpentine shapes of these prior devices as viewed from the inside of the pyramid consist of parallel alternating lands and valleys that project from adjacent the exposed bottom edges of the pyramid and intersect with the corner tunnel. One of the valleys of each side wall (at the center of the side wall) intersects at the juncture of the three tunnels, i.e., the peak of the pyramid as illustrated in the accompanying drawings.

As explained in the Background of the Invention, the structure of these prior devices has the problem of (a) splitting apart at the edge tunnels; (b) providing inadequate support for an article corner having a reveal side edge; (c) having inadequate cushion to protect relatively heavy articles when subjected to an impact or when subjected to crushing from heavy loading as when stacked in multiple tiers; (d) impacts directed to the peak of a pyramid resulting in crushing of the peak (and splitting along the tunnel) and (e) splitting lengthwise along the side wall valleys as a result of forces applied during impact that urges spreading of the pyramid sides.

These problems ((a)–(e)) are addressed by the present invention as briefly described below.

(a) The splitting at the tunnels is alleviated by forming the edge tunnels so as to be undulated along its length rather than simply straight. The tunnel undulations provide additional flexure and strength and provides stops against a split that would otherwise run the length of the tunnel. (The undulations reduce in part the spacing from the protected product edge but do not eliminate the spacing.) The flange at the bottom of the tunnel is closed and lessens the likelihood of splits starting at the bottom edge of the tunnel.

(b) The valleys on the inside wall do not extend to the tunnels. Thus, a solid rib (bench or land) of material extends along the side of each tunnel to the peak. A reveal on the protected article which extends a short distance inwardly from the tunnel is thus supported by a continuous strip (land) of the cushioning material.

(c) The serpentine shape formed into the inner walls of the device is produced from a serpentine configured mold form where the spacing across the screen valleys of the serpentine shape is only slightly greater than twice the material thickness (mat thickness). Thus as the material is vacuum formed onto the mold form, the mat thickness projected into the screen valley (on the outside face of the device) from both sides (to produce the lands of the device) is largely merged together to form columns of the material having a double mat thickness which provides added strength in the same manner as a columnar structure. The affect of the double mat thick columns tied together by rebounding arches of single mat thickness is that a two-step cushion is provided. Depending on the severity of an impact, a first force level will collapse the arches which will readily rebound and if a second greater force level is applied, upon collapse of the rebounding arches, that greater force then has to crumple or crush the column which provides superior resistance while nevertheless yielding under such a force level to provide the desired cushioning.

(d) and (e) Resistance to crushing of the peak and splitting of the sides is believed similar to the phenomena of an arch being stronger than a cross beam. The peak is formed into a dome and the exposed bottom or peripheral edge of the pyramid is curled or curved (convexly as viewed from the outer side of the pyramid). Thus, a force applied at the dome or bottom edge that urges splitting is essentially applied against an arch and is more effectively resisted with a lesser likelihood of splitting.

Whereas the above explanations are but brief descriptions of the improved device, the reader will more clearly appreciate and understand the invention and the improvements thereof upon reading the following detailed description of a preferred embodiment and having reference to the accompanying drawings.

DETAILED DESCRIPTION OF THE DRAWINGS

FIG. 1 is a perspective view of an article protected by protecting devices of the invention and packed in a shipping container;

FIG. 2A is a top perspective view of a protecting device shown in FIG. 1;

FIG. 2B is a bottom view of the device of FIG. 2A illustrating the inside of the device;

FIGS. 3A and 3B are outside and inside views of a wall of the device of FIGS. 2A and 2B;

FIGS. 4A and 4B are section views as taken on section lines 4A—4A and 4B—4B of FIGS. 3A and 3B, respectively;

Figure 7:
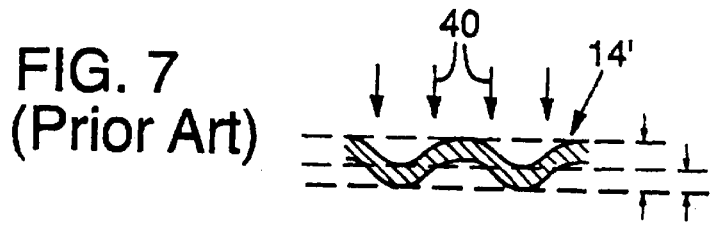
Figure 8:
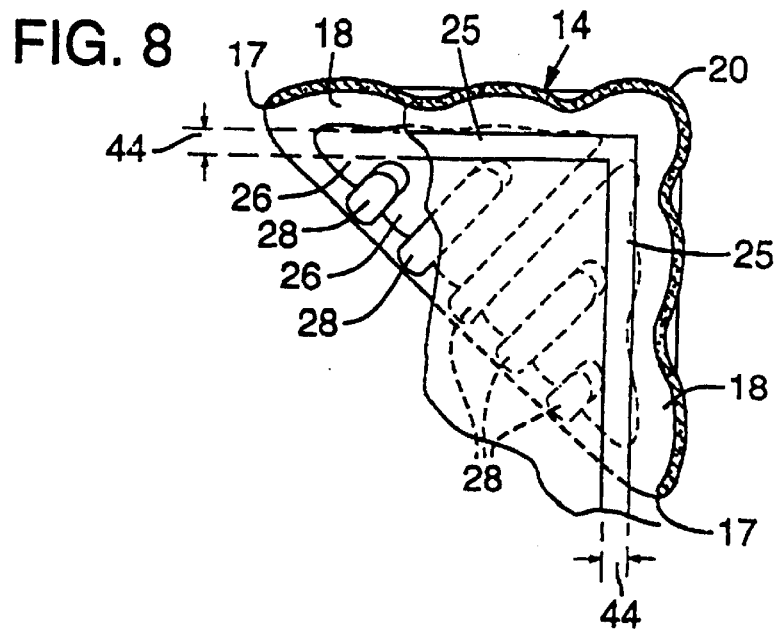

FIG. 7 schematically illustrates a comparable device of the prior art;

FIG. 8 is a cut out view of the device fitted to the corner of an article to be protected; and FIGS. 9–11 illustrate alternative protecting devices of the invention.

DETAILED DESCRIPTION OF A PREFERRED EMBODIMENT

FIG. 1 represents an article 10 such as a kitchen or bathroom cabinet, having substantially square corners, that is to be shipped in a container 12. As shown, corner protecting devices 14 are provided for each of the cabinet corners inside the container. It will be noted that regardless of how the carton 12 is dropped, e.g., onto a flat floor surface, the corner devices 14 will absorb some or all of the impact. Also during stacked storage, the devices 14 serve to distribute the resulting weight applied from overlying containers.

FIGS. 2A and 2B illustrate the corner protecting devices 14 from the outside and from the inside, respectively. As shown, there are three side walls 16 that are similar to each other and are joined at their side edges, each juncture forming a tunnel 18. Tunnels 18 converge at an apex that is formed into a dome shape or dome 20. As will be noted from FIG. 1, the dome 20 is fitted to the cabinet corner 22 and the three tunnels 18 are fitted to the three cabinet edges 24 that are flared away from the cabinet corner 22.

FIGS. 3A and 3B illustrate one of the triangular side walls 16, 3A being the outside surface and 3B being the inside surface (as viewed straight on or normal to the surfaces). FIGS. 4A and 4B are section views as taken on view lines 4A—4A, 4B—4B of FIGS. 3A and 3B, respectively, i.e., just above the bottom exposed side edge or flange 17. With reference to FIGS. 4A and 4B, it will be noted that the walls 16 are serpentine in cross section to form lands 26 and valleys 28 at the inner side of the side walls. It is to be also noted that the lands 26 are double thick columns of the waste-fiber material which are separated by the arch-like valleys 28.

Figure 5:
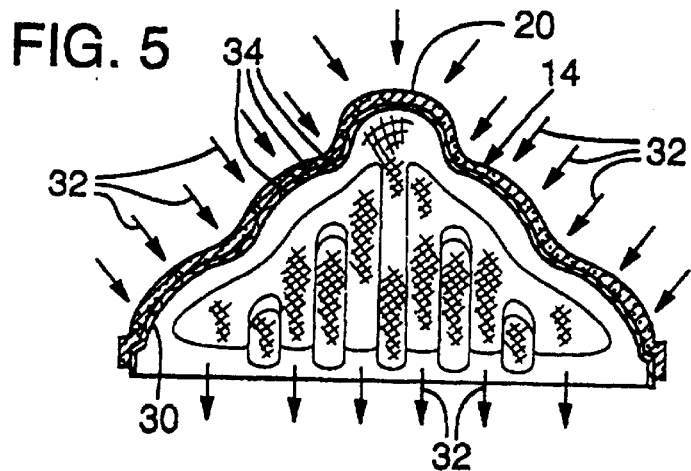
FIGS. 5 and 6 are views illustrating the molding process for molding the protecting devices.
Figure 6:
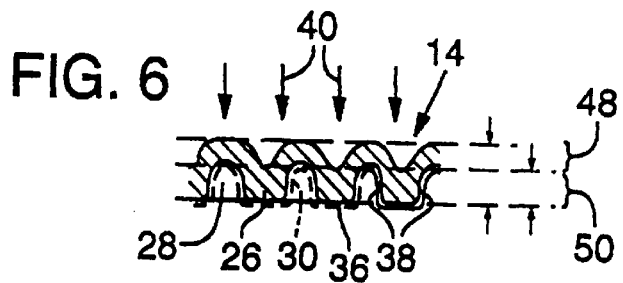

Reference is now made to FIGS. 5 and 6 which illustrate a manner of constructing the corner protecting devices 14. Reference 30 illustrates a mold form which is configured to achieve the desired shape of device 14. The mold form 30 is perforated in its entirety to render the mold form porous as indicated by reference 34. Typically, although not necessarily, the mold form is covered by a fine mesh screen which conforms to the mold contours. The mold form also may be a perforated-porous plastic or ceramic or the like.

In whatever type or kind, the mold form is mounted on a machine and the machine rotates the mold form into a vat of fibrous slurry, i.e., paper fiber suspended in water. The slurry is vacuum drawn onto the mold form as indicated by arrows 32. The water passes through the mold form as permitted by perforations 34 and the fibers build up on the outside surface of the mold form as shown. As the fiber builds, the resistance to water flow through the wall of the mold form increases thus inducing an even distribution of the paper fiber onto the mold form. (The greater the build up, the greater the resistance to flow and thus the thickness of the fiber deposit onto the mold form is maintained substantially constant.) In a short time (seconds), the device 14 is fully formed on the outer side of the mold form and has a nominally constant thickness of the deposited fiber throughout referred to as a "mat."

In its crudest form, the device is formed on a single mold form (either male or female). However, better control of the external dimensional tolerance, and improvement in protective property of the device can be obtained if the newly formed mat is first compressed in a mating (normally female) compression (or transfer) mold. The mold form is rotated out of the vat and transferred to a transfer device (transfer mold) which deposits the newly molded protecting device onto a conveyor (the transfer of the molded device from the mold form to the transfer device and then to the conveyor being accomplished by controlled air flow). The conveyor then conveys the devices through finishing steps for curing, etc.

FIG. 6 is a partial cross section of a side of the mold form 30 and the corner protecting device 14 after being formed thereon and before being separated from the mold form 30. As will be observed, the mold form has a substantially uniform serpentine shape, i.e., the lands and valleys of the mold form at both sides are similar. However, the material of the slurry is deposited only at the upper side of the mold form 30 as shown in FIG. 6. The material is formed into valleys 28 that are retained in their opened configuration by the screen shape, and into lands 26 which are closed as a result of the material being forced to the inside of the mold valley 36. By narrowing the loops of the serpentine shape of the mold (as compared to prior devices) as illustrated, the material deposited on the sides of the valley 36 will merge together to produce the lands 26 of double mat thickness. This results in a substantially vertical and thickened portion resembling a column. The sequential columns or lands are separated but tied together by arch portions that form the valleys 28. Subtle adjustments and clearance contours are incorporated in these areas if mating dies are incorporated in the forming and transfer operations.

Compare this closed loop configuration of FIG. 6 to the open loop configuration, e.g., of the prior art as seen in FIG. 7. Note that a compressive force indicated by arrows 40 will flatten the serpentine shape and when flattened will provide minimal cushioning, i.e., the force after such flattening is largely transmitted to the article being protected. In the FIG. 6 configuration, a first force of sufficient magnitude will flatten the arch portion (referred to as a rebounding zone 48) down to the thickness of the lands 26 (referred to as a crumple zone 50) and thereafter a greater compressive force is required to compress progressively (i.e., or crumple) the lands 26 which bulge laterally as permitted by the separation between the lands (i.e., the valleys 28).

A further benefit will become apparent from the comparison of FIGS. 6 and 7. Within the same area (width and height) a substantially greater number of lands and valleys are formed (e.g., 50% greater). Further, note the configuration of the two devices and how the forces are applied. Forces 40 are primarily crushing forces as applied against vertical walls in FIG. 6. The forces of FIG. 7 are applied as bending forces that simply straighten the wall 14, i.e., molded fiber is stronger in compression resistance and when subjected to bending or pulling forces will more readily fail due to its tensile weakness.

Reference is now made to FIG. 8 which is a cut away view of a corner protecting device 14 fitted to a corner of a cabinet. Included in the illustration of the device 14 is a tunnel portion 18, a dome portion 20 and lands 26 and valleys 28. The cabinet has a recessed (or open) top or bottom (facing the viewer) whereat the only support for the cabinet by the device 14 is at the edges/reveals 25 of the adjoining panels. The valleys 28 (other than the center valley) are terminated short of the tunnel 18. Thus support by the device for the reveal 25 is provided by the continuous strip of material between the uppermost extension of valley 28 and the tunnel side. The continuous strip support is indicated by dash lines 44 in FIGS. 3B and 8. Both tunnel side edges and the ends of the valley that borders strip 44 produce the thicker land portions that function in the manner of a column to lend added support and resistance to crumpling (see the above description comparing FIGS. 6 and 7).

From the same FIG. 8 it will be noted that tunnel 18 is undulated along its length. A force that tends to split the device 14 at the junctures, i.e., the tunnels 18, are resisted to a much greater degree due to this undulating configuration. This resistance is believed to be due at least in part because the tunnel portions will fold lengthwise somewhat in response to such splitting forces offering a spring-like effect. Also because of the arch configuration, a force directed at a tunnel will be directed so as to induce a complex crushing and flattening force rather than the simple flattening and inherent tensile force applied to prior art devices. Also, as the arch resists the force by bulging outwardly, the container in which the devices are tightly contained will resist such bulging to add resistence and resilience. The same result occurs at the rounded dome 20 and at the flanges 17 (note the rounded edge of flange 17 in FIGS. 3B and 8). These curved or rounded portions further provide resistance to splitting, a concern particularly along a straight tunnel or a valley 28 extended to the exposed bottom edge of the device. A split at the edge is far less likely to occur due to the flange 17 which extends around the entire edge periphery (a closed loop) and functions to tie the structure together. A split that is started along the tunnel wall is far less likely to run the length of the tunnel as a result of having to traverse the undulation.

The above description of FIGS. 1–8 is considered to provide a description of a preferred embodiment only and persons skilled in the art will become aware of numerous modifications without departing from the invention. For example, certain of the features explained above have application to a modified corner protecting device 52 as illustrated in FIGS. 9 and 10. The device 52 is primarily designed to fit article corners that may not be square. Device 52 has two halves 52a and 52b interconnected by hinge portion 54. Each half is shaped to form upper and lower (or left and right) sides 51 and 53, the lower sides 53 being connected by hinge portion 54 and the upper sides 51 each provided with an angled relief 56 to allow the two halves to be folded together around the hinge portion 54 as shown in FIG. 10. As determined by a corner of an article, the two halves can be folded to most any angle but notably between 90 degrees and 180 degrees as illustrated in the drawings of FIGS. 10 and 9, respectively. The device 52, as described for the devices of FIGS. 1–8, include the undulating tunnel 18, lands 26 and valleys 28, 28', the valleys 28 terminating prior to the tunnels to form strips 44, and further including flanges 17.

A still further modification is illustrated in FIG. 11 which is an edge protecting device 56 designed to fit and protect an edge of an article, e.g., a straight edge between the corners of an article. The elongate edge protecting device 56 includes upper and lower (or left and right) side portions 58, 60 which are formed to include lands 26 and valleys 28 as well as edge flanges 17. Whereas the edge protecting device 56 is intended to extend a determined edge length, usage thereof has shown that a long stretch of the described continuous pattern can result in undesired buckling of the device when subjected to an impact. Accordingly, the tunnels 18 are straight rather than undulated and the walls are scribed to provide lines 62 of weakness that will permit bending of the device prior to buckling.

It will be appreciated that whereas the discussions herein have primarily emphasized the added strength achieved for the protecting devices, one can view the invention as also enabling a similar strength as that of prior devices but with a thinner mat thickness. Thus, the material usage can be reduced which requires less molding time and in combination, reduces the cost of providing the corner and edge devices. It will also be appreciated by those skilled in the art that modifications of the devices can be made to accommodate or protect projections (such as feet or handles on the article). The geometry of certain undulations of the device are sometimes modified, or clearance holes are provided, or the like.

The claims accordingly are to be interpreted by the plain meaning of the words which define the intended invention.

The invention claimed is:

1. An article edge or corner protecting device of vacuum molded fiber and as molded defining a material thickness, said device comprising:

first and second elongate wall portions each having opposed elongate edges, said first and second wall portions joined together along one each of said edges and oriented to form an angle to thereby define inner and outer wall sides and a curved juncture there between adapted to receive an edge of an article to be protected, the inner sides of said wall portions adapted for engagement of article wall segments adjacent said article edge;

said inner wall sides having a serpentine configuration defining lands and valleys and spaced sufficiently close together whereby, as molded, the lands produced are at least in part the defined material thickness doubled onto itself to form substantially vertical columns identified as crumple zones and the intervening valleys form arches of single material thickness that interconnect the lands and are identified as rebounding arch zones.

2. A corner protecting device as defined in claim 1 including a third elongate wall portion, said elongate wall portions forming three triangular shaped wall portions with inner and outer sides, the walls molded into an integral pyramid shape having a hollow center, a peripheral base edge and a peak at opposed ends of the device which is adapted to fit a corner of an article to be protected as in shipping;

said walls of said device each have a base edge and an apex cooperatively forming said peripheral base edge and peak of the pyramid, and each of said walls being formed having a serpentine configuration defining lands and valleys directed generally upwardly from said lateral base edge of the walls, said walls having side edges cooperatively formed to provide outwardly rounded corners which provide an inner elongate concave cavity referred to as tunnels.

3. A corner protecting device as defined in claim 2 wherein the tunnels are formed into an undulated pattern along their length.

4. A corner protecting device as defined in claim 2 wherein the walls have a defined mat thickness throughout and the width of the lands are substantially twice the mat thickness.

5. A corner protecting device as defined in claim 2 wherein said peak is dome-shaped having an arch-shaped cross section whereby an impact force applied against the dome is applied as a complex crushing force.

6. A corner protecting device as defined in claim 2 wherein the lands and valleys are directed perpendicular from said lateral base edge and terminate short of the tunnel to provide a continuous strip of support material extended along the tunnel to the peak.

7. An edge or corner protecting device as defined in claim 1 wherein the lands and valleys of the wall portions are oriented substantially normal to the edges of the wall portions, said valleys defining opposed ends spaced from the opposed elongate edges of the elongate wall portions and thereby providing a continuous unbroken strip along each elongate edge.

8. An edge or corner protecting device as defined in claim 7 wherein the device has a fixed elongate formation for application to an elongate straight edge of an article at least the length of the device, said device having lateral spaced apart scribes that function as weakened bend lines that inhibit buckling of the device upon the device being sufficiently impacted.

9. An edge or corner protecting device as defined in claim 1 wherein a lateral hinge segment extends from an edge of a side wall into the tunnel and the other side wall has a removed segment defining diverging angled edges extending from the hinge segment to the opposed free edges whereby bending of the device about the hinge segment forms a corner protecting device.

10. A corner protecting device as defined in claim 9 wherein the outer sides of the corner portions are undulated along their length.

11. An article corner protecting device of vacuum molded fiber and as molded defining a material thickness, said device comprising:

first, second and third triangular elongate wall portions, each having opposed elongate edges, said first, second and third wall portions joined together along one each of said edges and oriented to form three triangular shaped wall portions with inner and outer sides, the walls molded into a integral pyramid shape having a hollow center, a peripheral base edge and a peak at opposed ends of the device which is adapted to fit a corner of an article to be protected as in shipping;

said walls of said device each have a base edge and an apex cooperatively forming said peripheral base edge and peak of the pyramid, and each of said walls being formed having a serpentine configuration defining lands and valleys directed generally upwardly from said lateral base edge of the walls, said walls having side edges cooperatively formed to provide outwardly rounded corners which provide an inner elongate concave cavity referred to a tunnels; and said exposed base edges of the device curved inwardly to form a peripheral flange.

12. A corner protecting device of vacuum molded paper fiber comprising:

said device having three triangular shaped walls with inner and outer sides, the walls molded into an integral pyramid shape having a hollow center, a peripheral base edge and a peak at opposed ends of the device adapted to fit a corner of a product to be protected as in shipping;

said walls of said device adapted to fit the corner of an article each have a lateral base edge and an apex cooperatively forming said base and peak of the pyramid, and each of said walls being formed having a serpentine configuration defining lands and valleys directed perpendicular to said lateral base edge of the walls, said walls having side edges cooperatively formed to provide outwardly rounded corners which provide an inner elongate concave cavity referred to as tunnels;

said device as applied to an article having the tunnel fitted to an article corner and providing spacing around the corner, certain of said valleys at the inner side of said walls extending from the base edge toward the tunnels and stopping short of said tunnels to provide a continuous support strip of material at the inner side of the device along each side of the tunnels.

13. A corner protecting device as defined in claim 12 including a flange portion forming the peripheral bottom edge, the serpentine valleys and lands extending between but spaced from both said flanges and said tunnel.

14. A corner protecting device:

said device having three triangular shaped walls with inner and outer sides, the walls molded into an integral pyramid shape having a hollow center, a base and a peak at opposed ends of the device adapted to fit a corner of a product to be protected as in shipping;

said walls of said device each have a lateral base edge and an apex cooperatively forming said base and peak of the pyramid, and each of said walls being formed having a serpentine configuration defining lands and valleys directed perpendicular to said lateral base edge of the walls, said walls having side edges cooperatively formed to provide outwardly rounded corners which provide an inner elongate concave cavity referred to as tunnels;

said tunnels defining a length from the base to the peak of the device and the tunnels formed into undulations along said length for increased resistance to splitting when subjected to a compressive force.

15. A corner protecting device as defined in claim 14 including a flange portion forming the peripheral bottom edge, the serpentine valleys and lands extending between but spaced from both said flanges and said tunnel, said peak forming a dome adapted overlie a corner of an article and the dome, the tunnels and the flanges all providing arches in cross section that require a complex compressive force for crushing said arches.

* * * * *